US005880946A

United States Patent [19]

Biegel

[11] Patent Number: 5,880,946

[45] Date of Patent: Mar. 9, 1999

[54] MAGNETICALLY CONTROLLED TRANSFORMER APPARATUS FOR CONTROLLING POWER DELIVERED TO A LOAD

[76] Inventor: George Biegel, 1500 Worcester Rd. Suite 831, Framingham, Mass. 01702

[21] Appl. No.: 998,716

[22] Filed: Dec. 29, 1997

[51] Int. Cl.[6] .................... H02M 7/44

[52] U.S. Cl. .................... 363/75; 363/140

[58] Field of Search .................... 363/75, 97, 131, 363/140, 101

[56] References Cited

U.S. PATENT DOCUMENTS

| | | | |
|---|---|---|---|
| 4,163,189 | 7/1979 | Smutny | 323/250 |
| 4,897,773 | 1/1990 | Bilczo | 363/56 |
| 5,715,150 | 2/1998 | Stava | 363/41 |

*Primary Examiner*—Shawn Riley

*Attorney, Agent, or Firm*—Charles Bickoff

[57] ABSTRACT

A magnetically variable transformer having primary and secondary windings wound on a magnetic core wherein the transformer core with associated windings is placed in close proximity to an independently wound control coil. The control coil is positioned in one configuration on a focusing armature whose poles straddle the transformer core at positions on opposing sides. In a second configuration the transformer core is placed within the bore of the control coil and an optional focusing armature concentrates the magnetic field at the poles. Application of a control current forms poles at the control coil extremities and causes a change in permeability of the transformer core thereby altering the power output of the transformer inversely to the magnitude of the control current. The magnetically variable transformer controls a D.C. to A.C. inverter circuit which is useful in supplying power to a fluorescent lamp and other A.C. receptive loads. Additionally, a derived D.C. current from the output of the inverter circuit in series with resistive control elements modulates the level of the control current.

14 Claims, 2 Drawing Sheets

MAGNETICALLY CONTROLLED TRANSFORMER APPARATUS FOR CONTROLLING POWER DELIVERED TO A LOAD

STATEMENT REGARDING FEDERALLY SPONSORED RESEARCH OR DEVELOPMENT

Not applicable

CROSS-REFERENCES TO RELATED APPLICATIONS

Not Applicable

Microfiche Appendix

Not Applicable

BACKGROUND OF THE INVENTION

1. Field of the Invention

The present invention pertains to the field of Inverter Circuits used to convert direct current, D.C., to alternating current, A.C. In general, such apparatus have been designed to receive a D.C. input which in turn is converted to an A.C. source suitable for driving an A.C. receptive load. The disclosed apparatus controls the inverter circuit by altering the magnetic characteristics of the transformer which supplies the base current to the inverter transistors or equivalently, the voltage to the source of MOSFET power transistors.

2. Prior Art

A common power inverter application is to provide compatible A.C. power to operate fluorescent lamps, Cold Cathode Fluorescent lamps, and electro-luminescent panels. Fluorescent lamps are commonly used to provide illumination, particularly in industrial environments where their economy of power utilization is highly desirable. Because of their greater efficiency in converting electricity to light, the cost of utilization is significantly reduced when compared to incandescent lighting.

Cold Cathode Fluorescent lamps (CCFLs) are used to backlight Liquid Crystal Displays (LCDs) in computer applications and Electro-luminescent (EL) panels are used to backlight LCDs, key switches, and other devices in many applications. Their popularity is due to high efficiency and small size. These devices require a high voltage ac current to drive them. This power is commonly supplied by power inverter circuits.

A common limitation of these devices has been that they have required sophisticated circuitry to vary the brightness of the above mentioned lamps. Most modern fluorescent lamp ballasts utilize a D.C. to A.C. inverter circuit to strike and supply operating power to the lamps. Many inverter circuits commonly supply a non-variable voltage to the load. As control circuitry is added to accomplish regulation or dimming of the light source, the complexity and cost has historically increased dramatically while the reliability and manufacturing consistency have decreased. Additionally the control circuitry often interacts in an undesirable manner with various aspects of the circuitry thereby requiring further complexity to compensate for these effects.

Likewise, switching power supplies and high frequency supplies for driving halogen lamps commonly suffer from the same limitations.

The present invention addresses the above limitations in several ways. The first is that the apparatus described herein is isolated and independent from the drive circuitry. It requires very few components and does not require complex feedback loops to control the inverter output level. Secondly when used to drive a fluorescent lamp load, a series resonant circuit comprised of an inductor and resonant capacitor is often used to boost the voltage level to that required to strike and operate the lamp. By adding a secondary to the series resonant inductor and rectifying the output into D.C., this voltage can be used to supply the control current on a delayed basis and thereby provide full start up power to the fluorescent lamp load independent of the setting of any dimming or level controls. Alternatively, in conjunction with a simple RC timer, the modified inverter circuit is also able to strike the lamps at a very low dimming level.

BRIEF SUMMARY OF THE INVENTION

The invention herein described is for a magnetically controlled output transformer which is useful to control the power level supplied to fluorescent lamps, LCDs, and Electroluminescent lamps. It also has uses in controlling the output power level in switching power supplies. The method utilized in controlling the power output involves applying an external non-coupled controlling magnetic field to the core of the transformer. The present invention includes a magnetic means to control the power output of a secondary winding of a transformer having a control winding on a core independent of the core upon which the primary and secondary windings of the output transformer are wound. The control winding being wound on an independent core does not induce a voltage in either the primary or secondary windings of the transformer. The magnetic field generated by the control winding acts as a magnetic valve to control the circulation of flux in the core of the output transformer by the application of a D.C. voltage to the control winding which creates a polarized field in the portion of the transformer core adjacent to the polarizing control core. One embodiment of output transformer is a toroid placed within a bobbin wound with the control winding. A soft iron core forms a pair of poles to shunt and concentrate the flux at the toroid. A second embodiment of output transformer involves the control coil being wound on a soft iron core wherein a pair of poles are placed across the extremities of the transformer core. In a third configuration, a control coil without benefit of focusing poles is placed close to the core of the transformer to control the permeability of the core.

Additionally, this apparatus provides a magnetic means for controlling the base currents supplied by a transformer to a pair of inverter transistors which in-turn control the A.C. voltage applied to a load. The load may be a gas discharge lamp. The control circuit can also provide a dimming or brightness control function through the use of a variable resistor, thermistor, or light sensitive resistor to control the voltage and current supplied to the control coil.

DETAILED DESCRIPTION OF THE INVENTION

The following description illustrates the invention by way of example, not by way of limitation of the principles of the invention. The description will clearly enable one skilled in the art to make and use the invention. It describes embodiments, variations, and adaptations including what I believe to be the best mode.

Figure 1:
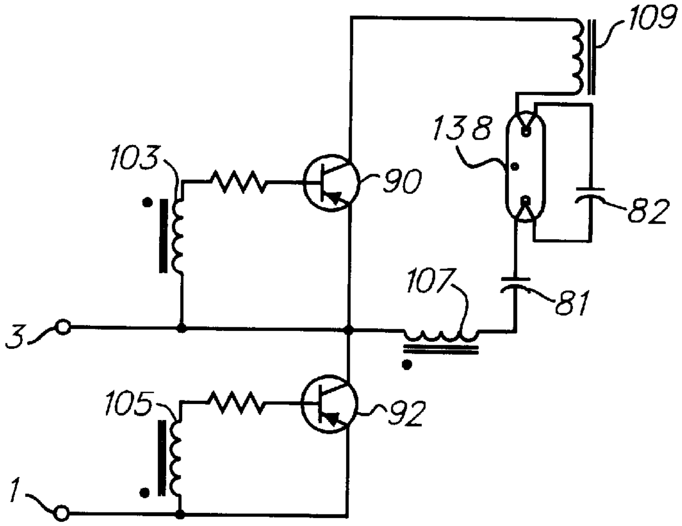
FIG. 1 is a simplified schematic of an inverter circuit with magnetic control of the base currents of a pair of inverter transistors.

FIG. 1 illustrates, by way of example, a typical D.C. to A.C. inverter circuit. In this depiction, the power transistors are shown as pnp type transistors 90 and 92. As will be obvious to those skilled in the art other inverter arrangements are possible, for example the use of MOSFETs. In this case, inductors 103, 105, and 107 are wound on a common core and the secondary windings, 103 and 105, are poled such that the outputs are out of phase. This allows the inverter transistors, 90 and 92, to be turned on and off out of phase and alternately create the positive and negative A.C. half cycles. Inductor 109 and capacitor 81 form a series resonant circuit useful for boosting the inverter output to a high voltage high frequency signal necessary to drive the lamp with no flicker. A starting capacitor 82 is connected across the lamp load to provide a warming current for the filaments in the lamp 138. Initially the lamp has a high impedance which allows the capacitor to rapidly charge and provide this current. Upon striking, the lamp impedance decreases dramatically limiting the charging current to capacitor 82.

Figure 2:
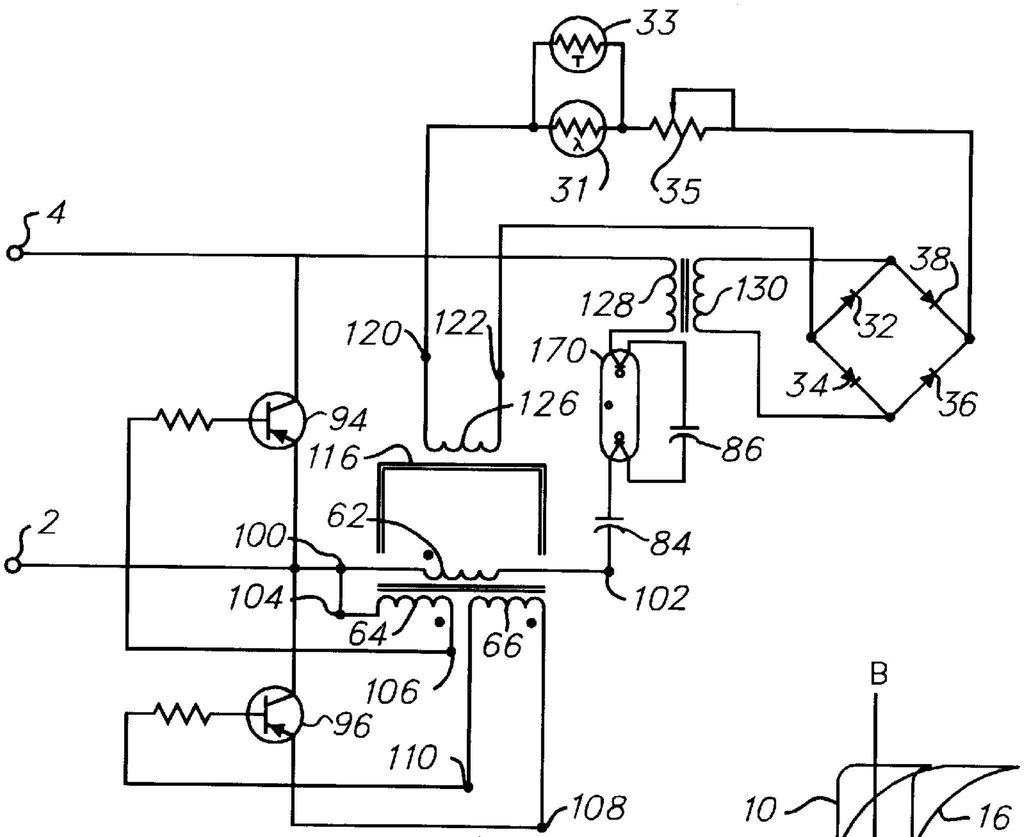
FIG. 2 is a simplified schematic of an inverter circuit with magnetic control of the base currents of a pair of inverter transistors. The control winding is wound on an independent core which is magnetically coupled to the core of the output transformer. Control elements serve to regulate the current flowing through the control winding.

FIG. 2 depicts the circuit of FIG. 1 with the addition of an electrically isolated magnetically coupled control coil to the construction of the output transformer. This transformer construction consists of a core cooperatively wound with a primary 62 and at least one secondary winding. In the configuration depicted, there are two secondary windings, 64 and 66, each of which are connected respectively to the base of an inverter transistor with the windings oppositely poled such that the outputs are out of phase. This allows the inverter transistors, 94 and 96, to be turned on and off out of phase and alternately create the positive and negative A.C. half cycles . Inductor 128 and capacitor 84 form a series resonant circuit useful for boosting the inverter output to a high voltage high frequency signal necessary to drive the lamp 170 with no flicker. A starting capacitor 86 is connected across the lamp load to provide a warming current for the filaments in the lamp. Initially the lamp 170 has a high impedance which allows the capacitor 86 to rapidly charge and provide this current. Upon striking, the lamp impedance increases dramatically limiting the charging current to capacitor 86.

Figure 3:
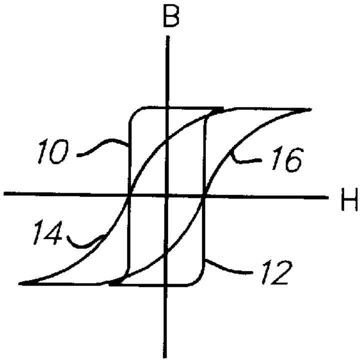
FIG. 3 is a B/H curve showing the change in coercivity due to the influence of an externally applied magnetic field.

As stated above the transformer is constructed in this case having a primary 62 and two secondaries 64 and 66. Additionally, there is a control winding on a separate magnetic core. This magnetic core 116 has at least one pole pair consisting of a north and south pole. The poles of the control coil are placed in close proximity to the primary transformer core which is generally constructed from a magnetically soft ferro-magnetic material. The application of a D.C. current or low frequency A.C. current to the control coil 126 produces a magnetic field across the poles. When placed in close proximity to the transformer core, increasing the field strength increases the apparent permeability of the transformer core thereby reducing the current output and power from the secondary windings while maintaining the voltage which is a function of the primary to secondary turns ratio. In effect the north pole of the control core generates a south pole adjacent to it in the transformer core and likewise the south pole of the control core generates a north pole adjacent to it in the transformer core. FIG. 3 shows a B/H curve representation wherein the curve bounded by 10 and 12 represents the magnetic characteristics of the transformer core prior to the application of the control current while the B/H curve bounded by 14 and 16 depict the characteristics after the application of the control current. The creation of these poles in effect changes the permeability of the transformer core and the output current varies inversely with respect to the permeability.

B=flux density; H=magnetic intensity; $\mu$=permeability;

l=length of the mean magnetic path; and i=current; N=number of turns $$H=Bl/\mu=Ni/l$$

$$\therefore i=Bl/\mu N$$

Additionally, inductor 130 when wound on the same core as inductor 128 forms the secondary of a voltage reduction transformer. This high frequency, greater than 20 KHz, A.C. output voltage when rectified by rectifier formed by diodes 32, 34, 36, and 38 serves as the control voltage that supplies control coil 126. As stated above, when the circuit initially starts, the lamp impedance is very low and inductor 128 will be close to saturation. This will result in a very low voltage in the secondary 130. The result will be that full startup power will be applied to the lamp load at full brightness. As the impedance of the lamp increases the voltage in the secondary will ramp up to the value preset by the turns ratio and the control coil 126 will bring the lamp brightness to the set dimming level. Due to the high frequency of the control voltage, a filter capacitor is unnecessary as noticeable flicker will not occur at 20 kHz. There is no power in the dimming circuit if the lamp 170 is disconnected or a filament fails at end of life.

FIG. 2 also shows control current modifying elements 31, 33, and 35. These resistive elements vary their resistance with respect to light, temperature, or adjusted resistance. As the resistance of these elements increase, the control current will decrease and the output current of the output transformer will increase, thereby increasing the brightness of the lamp 170. Inversely when the resistance of these elements decrease, the control current will increase and the output current of the output transformer will decrease, thereby decreasing the brightness of the lamp 170.

Figure 4:
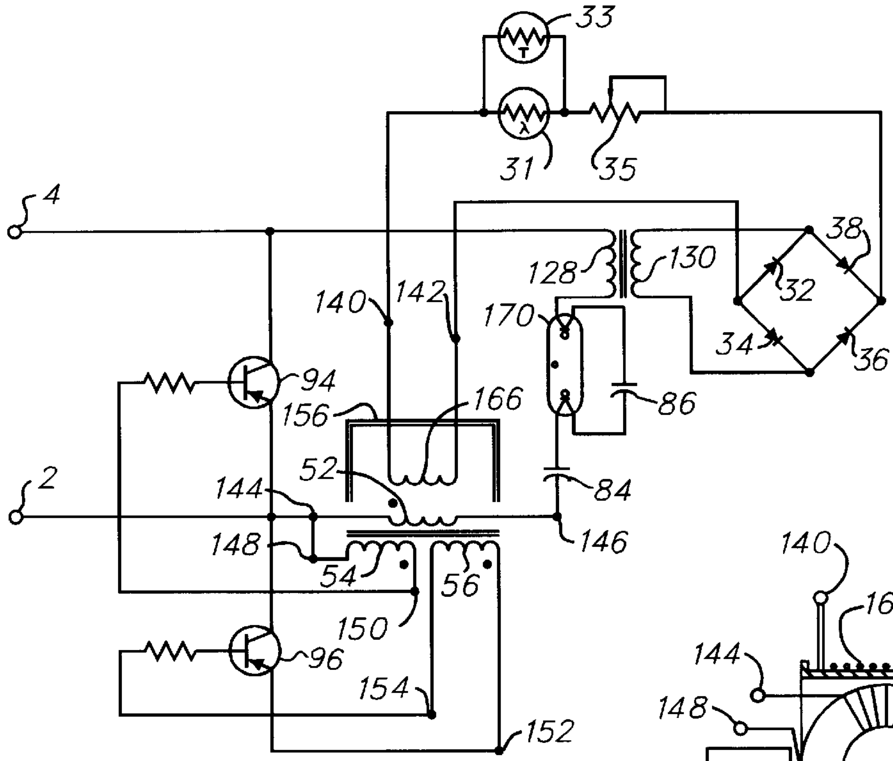
FIG. 4 is a simplified schematic of an inverter circuit with magnetic control of control signals of a pair of inverter transistors wherein the control winding is wound on a bobbin and the output transformer is placed within the bore of the winding. Control elements serve to regulate the current flowing through the control winding.
Figure 6:
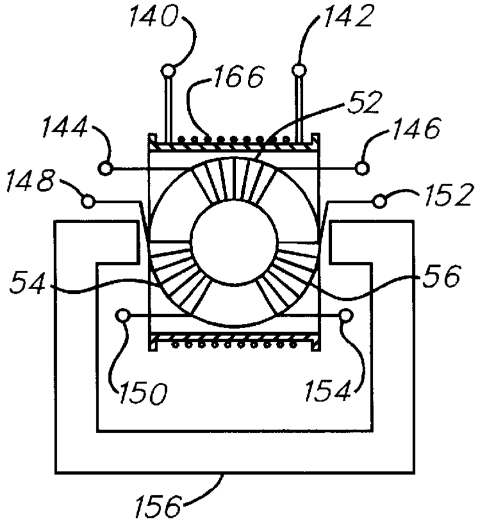
FIG. 6 is a partially sectioned plan view of the output transformer arrangement showing the output transformer arranged within a bobbin upon which is wound the control coil. A magnetic shunt concentrates the magnetic control field at substantially opposing points on the circumference of the output transformer.

FIG. 4 depicts the same circuit as shown in FIG. 2 with the exception that the output transformer consisting of the primary 52 and secondary windings, 54 and 56, are wound on a core and is placed within the bore of a bobbin wound with the control coil 166. Optionally a magnetic concentrator 156 as shown in FIG. 6 focuses the magnetic field at the opposite ends of the bobbin in close proximity to the core and windings of the output transformer. For clarity the control coil is sectioned to show the arrangement of the transformer within the control coil. Applying a D.C. voltage to the control coil 166 through coil leads 140 and 142 causes an apparent change in permeability as previously discussed. All of the remaining circuitry and functional description relating to FIGS. 2 and 3 apply.

Additionally, FIG. 4 shows control elements light sensitive resistor 31 and thermistor 33 as well as variable resistor 35. These elements serve to vary the current flow through the control coil and thereby the magnitude of the magnetic field generated in control coil 58. These elements may be utilized singularly or in series or parallel combinations to achieve the desired control results. The use of the light sensitive resistor can control the power output of the transformer based on the light output of the lamp or the ambient light level. In the first case, the current will be adjusted to keep the light output constant while in the second case the brightness might be adjusted inversely to the ambient light level. The thermistor might be used to provide maximum current at low temperatures to assure starting while reducing the current at higher temperatures. The variable resistor allow the lamp to be dimmed according to the desired level of light. It will be recognized by those familiar with the art that other control elements which actively or passively vary the magnitude of the control current are applicable to the scope of the invention. It will also be recognized by those skilled in the art that the invention is not limited to toroidal transformers as shown in the figures, but that other core arrangements consistent with the intent of the present invention are applicable.

Figure 5:
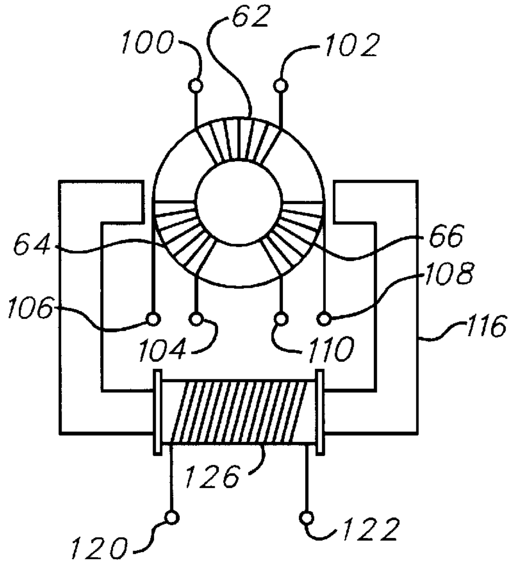
FIG. 5 is a plan view of the output transformer arrangement showing the control coil wound on a magnetic core which concentrates the magnetic control field at substantially opposing points on the circumference of the output transformer.

In FIGS. 2 and 4 input node 2 is the negative or ground input from a DC voltage source while node 4 is the input to the positive rail from a DC voltage source. FIG. 5 is a physical depiction of the transformer arrangement wherein the control coil is placed upon the flux concentrator. The control coil has input nodes 120 and 122 which correspond to like points in FIG. 2. Additionally the primary nodes 100 and 102 as well as the secondary nodes 104, 106, 108, and 110 of FIG. 5 have corresponding nodes within FIG. 2.

Likewise, FIG. 6 is a physical depiction of the transformer arrangement wherein the transformer is placed within the control coil and an optional flux concentrator focuses the magnetic flux to affect the permeability of the transformer core. The control coil has input nodes 140 and 142 which correspond to like points in FIG. 4. Additionally the primary nodes 144 and 146 as well as the secondary nodes 148, 150, 152, and 154 of FIG. 6 have corresponding nodes within FIG. 4. Those skilled in the art will recognize that various well known circuit arrangements can supply the required DC input signals to operate the converter circuit depicted in FIGS. 2 and 4. As such only the DC to AC conversion circuit has been shown.

As will be obvious to persons skilled in the art, various modifications, adaptations, and variations of the specific disclosure can be made without departing from the teaching of the invention.

Having thus described this invention, what is claimed is:

1. A variable transformer consisting of:

a magnetic core upon which is wound at least one primary coil for receiving an input voltage;

said magnetic core additionally having at least one secondary coil for supplying an output voltage proportional to a turns ratio defined by the number of turns of the secondary coil in the numerator to the number of turns of the primary coil in the denominator and a primary current;

said magnetic core being fabricated from a magnetically soft material;

a control coil proximate to and physically isolated from the magnetic core of said variable transformer wherein said Physical isolation of said control coil beneficially assures electrical isolation from said primary coil and said secondary coil of said variable transformer;

said control coil receiving a control current wherein said control current generates a magnetic field;

said magnetic field causing a change in permeability of the magnetic core of said variable transformer in a physically non-coupled manner wherein said permeability in said magnetic core is increased as said control current in said control coil increases; and said output voltage of said variable transformer decreases with the increase of said permeability.

2. The variable transformer of claim 1 having one primary coil for receiving an input voltage and a first secondary coil and second secondary coil each supplying an output voltage and current;

said first secondary coil and said second secondary coil being wound on a core of magnetic material to produce currents out of phase from one another;

said first secondary coil and said second secondary coil each communcatingly control an inverter circuit for producing a high voltage high frequency A.C. power source;

said A.C. power source providing a power output inversely proportional to said control current of said variable transformer; and said A.C. power source being suitable for supplying a controllable power level to an A.C. receptive load.

3. The inverter circuit of claim 2 wherein said control current supplied to the control coil of said variable transformer is controllably modulated by a sensor element.

4. The inverter circuit of claim 3 wherein said sensor element is chosen from a group consisting of a thermistor, a light sensitive resistor and, a variable resistor.

5. A variable transformer consisting of:

a magnetic core upon which is wound at least one primary coil for receiving an input voltage;

said magnetic core additionally having at least one secondary coil for supplying an output voltage proportional to a turns ratio defined by the number of turns of the secondary coil in the numerator to the number of turns of the primary coil in the denominator and a primary current;

said magnetic core being fabricated from a magnetically soft material;

a control coil physically isolated from the magnetic core of said variable transformer wherein said physical isolation of said control coil beneficially assures electrical isolation from said primary coil and said secondary coil of said variable transformer, said control coil wound on a ferro magnetic flux focusing element wherein a first pole and second pole of said ferro magnetic flux focusing element are proximate opposing extremities of the magnetic core of said variable transformer;

said control coil receiving a control current wherein said control current generates a magnetic field;

said magnetic field causing a change in permeability of the magnetic core of said variable transformer in a physically non-coupled manner wherein said permeability in said magnetic core is increased as said control current in said control coil increases; and said output voltage of said variable transformer decreases with the increase of said permeability.

6. The variable transformer of claim 5 having one primary coil for receiving an input voltage and said at least one secondary coil is a first secondary coil and a second secondary coil each supplying said output voltage and current;

said first secondary coil and said second secondary coil being wound on said core of magnetic material common to said primary coil to produce voltages out of phase from one another;

said first secondary coil and said second secondary coil each communcatingly control an inverter circuit for producing a high voltage high frequency A.C. power source;

a first end of said first secondary coil is communicatingly attached to a base of a first inverter transistor and second end of said first secondary coil is attached to a ground voltage and a collector of a second inverter transistor;

a first end of said second secondary coil is communicatingly attached to a base of said second inverter transistor and a second end of said second secondary coil is attached to an emitter of said second inverter transistor;

a positive D.C. voltage being supplied to a collector of said first inverter transistor and a ground voltage being supplied to a junction of an emitter of said first inverter transistor and a collector of said second inverter transistor;

said collector of said first inverter transistor is communicatingly attached to a first terminal of a series resonant inductor having a second terminal attached to a first terminal of a load;

a second terminal of said load is attached to a first terminal of a series resonant capacitor while a second terminal is attached to a first terminal of the primary of said variable transformer;

a second terminal of the primary of said variable transformer is attached to said ground voltage;

said inverter circuit for producing a high voltage high frequency A.C. power source is controlled through the application of said control current from one of the group of a D.C. source and a low frequency A.C. source to a pair of input terminals of said control coil;

said control current creating a magnetic field for controlling the permeability of said magnetic core wherein an output power of said inverter circuit is controlled; and said A.C. power source providing said output power inversely proportional to said control current of said variable transformer.

7. The variable transformer of claim 5 having a winding serving as a current source for an inverter circuit and also having a primary winding and at least two secondary windings for supplying a pair of inverter transistor base currents;

a series resonant inverter circuit for producing a high voltage high frequency A.C. power source is controlled through the application of said control current from one of the group of a D.C. source and a low frequency A.C. source to a pair of input terminals of said control coil;

said control current creating said magnetic field for controlling the permeability of said magnetic core wherein an output power of said series resonant inverter circuit is controlled; and said A.C. power source providing said output power inversely proportional to said control current of said variable transformer.

8. The inverter circuit of claim 6 wherein said control current supplied to the control coil of said variable transformer is controllably modulated by a sensor element.

9. The inverter circuit of claim 8 wherein said sensor element is chosen from a group consisting of a thermistor, a light sensitive resistor and, a variable resistor.

10. A variable transformer consisting of:

a magnetic core upon which is wound at least one primary coil for receiving an input voltage;

said magnetic core additionally having at least one secondary coil for supplying an output voltage proportional to a turns ratio defined by the number of turns of the secondary coil in the numerator to the number of turns of the primary coil in the denominator and a primary current;

said magnetic core being fabricated from a magnetically soft material;

a control coil physically isolated from the magnetic core of said variable transformer wherein said Physical isolation of said control coil beneficially assures electrical isolation from said primary coil and said secondary coil of said variable transformer;

said control coil being wound on a bobbin and said magnetic core of said variable transformer placed within a bore of a control coil carrying bobbin;

application of a control current to a pair of inputs to said control coil forms a magnetic field having a first pole and second pole proximate to opposing extremities of the magnetic core of said variable transformer;

said control coil receiving said control current wherein said control current generates a magnetic field;

said magnetic field causing a change in permeability of the magnetic core of said variable transformer in a physically non-coupled manner wherein said permeability in said magnetic core is increased as said control current in said control coil increases; and said output voltage of said variable transformer decreases with the increase of said permeability.

11. The variable transformer of claim 10 wherein a magnetic field focusing armature is placed with a first end adjacent to a first end of said control coil carrying bobbin and a second end of said magnetic field focusing armature is placed proximate a second end of said control coil carrying bobbin.

12. The variable transformer of claim 5 having one primary coil for receiving an input voltage and said at least one secondary coil is a first secondary coil and a second secondary coil each supplying said output voltage and current;

said first secondary coil and said second secondary coil being wound on said core of magnetic material common to said primary coil to produce currents out of phase from one another;

said first secondary coil and said second secondary coil each communcatingly control an inverter circuit for producing a high voltage high frequency A.C. power source;

a first end of said first secondary coil is communicatingly attached to a base of a first inverter transistor and second end of said first secondary coil is attached to a ground voltage and a collector of a second inverter transistor;

a first end of said second secondary coil is communicatingly attached to a base of said second inverter transistor and a second end of said second secondary coil is attached to an emitter of said second inverter transistor;

a positive D.C. voltage being supplied to a collector of said first inverter transistor and a ground voltage being supplied to a junction of an emitter of said first inverter transistor and a collector of said second inverter transistor;

said collector of said first inverter transistor is communicatingly attached to a first terminal of a series resonant inductor having a second terminal attached to a first terminal of a load;

a second terminal of said load is attached to a first terminal of a series resonant capacitor while a second terminal is attached to a first terminal of the primary of said variable transformer;

a second terminal of the primary of said variable transformer is attached to said ground voltage;

said inverter circuit for producing a high voltage high frequency A.C. power source is controlled through the application of said control current from one of the group of a D.C. source and a low frequency A.C. source to a pair of input terminals of said control coil;

said control current creating a magnetic field for controlling the permeability of said magnetic core wherein an output power of said inverter circuit is controlled;

said A.C. power source providing said output power inversely proportional to said control current of said variable transformer; and said A.C. power source being suitable for supplying a controllable power level to an A.C. receptive load.

13. The inverter circuit of claim 12 wherein said control current supplied to the control coil of said variable transformer is controllably modulated by a sensor element.

14. The inverter circuit of claim 13 wherein said sensor element is chosen from a group consisting of a thermistor, a light sensitive resistor and, a variable resistor.

* * * * *